(12) United States Patent
Van Der Ploeg (10) Patent No.: US 9,149,779 B2
(45) Date of Patent: Oct. 6, 2015

(54) PROCESS TO PROVIDE A PARTICULATE SOLID MATERIAL TO A PRESSURISED REACTOR

(75) Inventor: Govert Gerardus Pieter Van Der Ploeg, Amsterdam (NL)

(73) Assignee: Shell Oil Company, Houston, TX (US)

( * ) Notice: Subject to any disclaimer, the term of this patent is extended or adjusted under 35 U.S.C. 154(b) by 245 days.

(21) Appl. No.: 13/450,095

(22) Filed: Apr. 18, 2012

(65) Prior Publication Data

US 2012/0251408 A1 Oct. 4, 2012

Related U.S. Application Data (62) Division of application No. 12/355,406, filed on Jan. 16, 2009, now Pat. No. 8,182,561.

(60) Provisional application No. 61/024,457, filed on Jan. 29, 2008.

(30) Foreign Application Priority Data

Jan. 16, 2008 (EP) .................................... 08100545

(51) Int. Cl.
*B01J 8/00* (2006.01)
*C10J 3/00* (2006.01)
(Continued)

(52) U.S. Cl.
CPC ............... *B01J 8/0045* (2013.01); *B01J 8/003* (2013.01); *C10J 3/482* (2013.01); *F04D 5/001* (2013.01); *F04D 23/003* (2013.01);
(Continued)

(58) Field of Classification Search
CPC .................................. C01J 3/506; B65G 29/00

USPC ............................................................ 48/61
See application file for complete search history.

(56) References Cited

U.S. PATENT DOCUMENTS 3,402,684 A 9/1968 Gradischer et al. ........... 110/102
3,817,498 A 6/1974 Frankfurth et al.
(Continued)

FOREIGN PATENT DOCUMENTS

CN 1775920 5/2006 ................. C10J 3/56
EP 015037 9/1980 .............. F04D 23/00
(Continued)

OTHER PUBLICATIONS

Derek Aldred et al: International Freiberg Conference on IGCC & XtL Technologies, Jun. 16-18, 2005, Continuous Metered Injection of Coal Into Gasification and PFBC System Operating Pressures Exceeding 38 Bar (560 PSI)—Stamet Inc.
(Continued)

*Primary Examiner* — Matthew Merkling (57) ABSTRACT

A system to provide a particulate solid material to a pressurized gasification reactor includes a low pressure storage vessel fluidly connected to the inlet of a bulk materials pump, a first part of a transport conduit directly connecting the outlet of the bulk materials pump to an inlet of a diverter valve, a second part of the transport conduit connecting an outlet of the diverter valve to a burner as present in a reactor vessel, wherein said diverter valve is provided with a second outlet connecting a recycle conduit with the low pressure storage vessel and which diverter valve is adjustable to either fluidly connect the bulk materials pump to the burner or alternatively fluidly connect the bulk materials pump to the low pressure storage vessel.

9 Claims, 5 Drawing Sheets

(51) Int. Cl.
  *F04D 23/00* (2006.01)
  *C10J 3/48* (2006.01)
  *F04D 5/00* (2006.01)

(52) U.S. Cl.
  CPC .... *B01J 2208/00752* (2013.01); *C10J 2200/15* (2013.01); *C10J 2200/156* (2013.01); *Y02E 50/32* (2013.01)

(56) References Cited

U.S. PATENT DOCUMENTS

| | | | |
|---|---|---|---|
| 3,917,498 A | 11/1975 | O'Shima | |
| 3,950,147 A | 4/1976 | Funk et al. | 48/86 R |
| 4,120,410 A | 10/1978 | van der Burgt | 214/17 B |
| 4,343,627 A * | 8/1982 | Tanca | 48/202 |
| 4,368,678 A | 1/1983 | Ulveling | 110/347 |
| 4,510,874 A | 4/1985 | Hasenack | 110/347 |
| 4,516,674 A | 5/1985 | Firth | 198/617 |
| 4,523,529 A | 6/1985 | Poll | 110/263 |
| 4,605,352 A | 8/1986 | Scott et al. | 414/217 |
| 4,830,545 A | 5/1989 | Salter et al. | 406/12 |
| 4,838,738 A | 6/1989 | Salter et al. | 406/14 |
| 4,952,100 A | 8/1990 | Heep et al. | 406/182 |
| 4,955,989 A | 9/1990 | Mink | |
| 4,988,239 A | 1/1991 | Firth | 406/99 |
| 5,051,041 A | 9/1991 | Firth | 406/99 |
| 5,132,917 A | 7/1992 | Bass | |
| 5,355,993 A | 10/1994 | Hay | |
| 5,381,886 A | 1/1995 | Hay | 198/642 |
| 5,551,553 A | 9/1996 | Hay | 198/624 |
| 5,657,704 A | 8/1997 | Schueler | 110/106 |
| 6,823,845 B2 * | 11/2004 | Schueler | 123/446 |
| 7,007,452 B1 * | 3/2006 | Baryshnikov et al. | 60/39.094 |
| 7,044,288 B2 | 5/2006 | Baer et al. | 198/642 |
| 2004/0071618 A1 | 4/2004 | Sprouse et al. | 422/232 |
| 2007/0079554 A1 | 4/2007 | Schingnitz et al. | 48/210 |
| 2008/0022595 A1 | 1/2008 | Lemaire et al. | |

FOREIGN PATENT DOCUMENTS

| | | | |
|---|---|---|---|
| EP | 0015037 A1 | 9/1980 | |
| EP | 029262 | 5/1981 | F04D 23/00 |
| EP | 038597 | 10/1981 | |
| EP | 0127273 A2 | 12/1984 | |
| EP | 400740 | 12/1990 | C10J 3/48 |
| EP | 0582521 A1 | 2/1994 | |
| EP | 1577414 A2 | 9/2005 | |
| EP | 1736527 | 12/2006 | C10J 3/00 |
| GB | 900464 | 7/1962 | |
| GB | 2259694 | 3/1993 | C10J 3/30 |
| JP | S59227977 A | 12/1984 | |
| JP | H02008603 A | 1/1990 | |
| JP | 02-133524 U | 11/1990 | |
| JP | H06201112 A | 7/1994 | |
| JP | 2004-510938 A | 4/2004 | |
| JP | 2005-281855 A | 10/2005 | |
| JP | 2006-274312 A | 10/2006 | |
| JP | 2007-516150 A | 6/2007 | |
| WO | WO 9966008 | 12/1999 | C10J 3/10 |
| WO | 1152963 | 2/2000 | B65G 31/04 |
| WO | 0181825 A1 | 11/2001 | |
| WO | 2005000749 A2 | 1/2005 | |
| WO | WO2008152048 | 12/2008 | F04D 23/00 |

OTHER PUBLICATIONS

Chapter 6.2 in Gasification, by Christopher Higman and Maarten van der Burgt, 2003, Elsevier Science, Burlington MA, pp. 173-177.
Chapter 6.2 in Gasification, by Christopher Higman and Maarten van der Burgt, 2003, Elsevier Science, Burlington MA, pp. 182-183.
M. Pach, R. Zanzi and E. Björnbom, Torrefied Biomass a Substitute for Wood and Charcoal. 6th Asia-Pacific International Symposium on Combustion and Energy Utilization. May 2002, Kuala Lumpur.
Bergman, P.C.A., "Torrefaction in combination with pelletisation—the TOP process", ECN Report, ECN-C-05-073, Petten, 2005.
Chapter 5 in Gasification, by Christopher Higman and Maarten van der Burgt, 2003, Elsevier Science, Burlington MA, pp. 109-128.

* cited by examiner

PROCESS TO PROVIDE A PARTICULATE SOLID MATERIAL TO A PRESSURISED REACTOR

This patent application is a divisional application of U.S. patent application Ser. No. 12/355,406, filed Jan. 16, 2009, which claims the benefit of European patent application No. 08100545.6, filed Jan. 16, 2008 and U.S. Provisional Application 61/024,457, filed Jan. 29, 2008, both of which are incorporated herein by reference.

FIELD OF THE INVENTION

The invention is directed to a process to provide a particulate solid material to a pressurised reactor.

BACKGROUND OF THE INVENTION

U.S. Pat. No. 3,402,684 is directed to a process to provide bark from an atmospheric pressure portion to a subatmospheric pressure portion.

WO-A-99/66008 describes a fixed bed gasification reactor for municipal waste.

In a coal gasification process pulverised coal is fed to a pressurised gasification reactor either as a dry solid or as a slurry. A commercial process to pressurize dry pulverised coal comprises the use of a lock hopper as described in Chapter 6.2 in Gasification, by Christopher Higman and Maarten van der Burgt, 2003, Elsevier Science, Burlington Mass., Pages 173-177. A disadvantage of using such a lock hopper design is the cycling of multiple batch tanks, the disruptions that occur when one such tank is taken off line and another is started and the venting of significant quantities of pressurising gas. The same textbook mentions on pages 182-183 solids pumping as an alternative. It is described that many types of equipment have been developed but thus far none have been very successful because they are vulnerable for erosion and fouling. Examples of solid pump systems in which Maarten van der Burgt, one of the authors of this reference book, was named as inventor are EP-A-038597 and EP-A-029262.

The solids pump as described in U.S. Pat. No. 5,657,704 seems to have more potential for actual commercial application, because the design of this solids pump seems less vulnerable for fouling and erosion than the earlier and above referred to designs. This publication describes a method for continuously supplying solids from a lower pressure storage reservoir to a high-pressure feeder tank using a solids pump. From the feeder tank the solids are transported to a high-pressure blast furnace. The solids pump according to this publication is preferably a high pressure solids pump available from STAMET Incorporated. Publications describing such a pump are U.S. Pat. No. 4,516,674, U.S. Pat. No. 4,988,239 and U.S. Pat. No. 5,051,041.

A disadvantage of the process of U.S. Pat. No. 5,657,704 is the presence of a high-pressure feeder tank between the solids pump and the pressurised reactor. Because of this intermediate feeder tank it is not possible to directly control the flow of solids to the pressurised reactor by controlling the rotational speed of the solids pump itself. The control of solids is especially critical when the pressurised reactor is a gasification reactor. In such a process the ratio of oxygen to carbon has to be kept within certain ranges in order to maximise the production of carbon monoxide and hydrogen.

It would be an advancement in the art to provide a process to provide a particulate solid carbonaceous material to a pressurised gasification reactor, which does not have the above-mentioned problem.

SUMMARY OF THE INVENTION

The above has been achieved by the following process. A process to provide a particulate solid carbonaceous material to a pressurised gasification reactor comprising the following steps, (a) transporting the solid material from a first lower pressure zone to a higher pressure zone using a bulk materials pump comprising a housing having a flow path for the solid material between an inlet fluidly connected to the first lower pressure zone and an outlet fluidly connected to the higher pressure zone, wherein said flow path in said housing is further defined by a space between two rotatable drive disks spaced from each other and wherein a materials scraper is present between said drive disks at the outlet to route a cake of solid material that is being transported between said drive disks to a transport conduit, which transport conduit fluidly connects the outlet of said housing and a burner as present in the gasification reactor, and (b) injecting a gaseous stream into the cake of solid material where the cake of solid material is discharged from the housing and enters the transport conduit, and (c) transporting the solid material and the gaseous stream in a transport conduit to the burner.

Applicants have found that the process according to the invention makes it possible to directly feed the particulate solid material to the pressurised reactor. The use of the gaseous stream is beneficial in that it breaks open the compacted cake as it is discharged from the solids pump. The gaseous stream subsequently carries the solids as a homogeneous mixture of solids and gas through the transport conduit to the pressurised reactor as a stable flow. Another advantage is that the solids flow to the reactor can be directly influenced by varying the rotational speed of the drive disks.

DETAILED DESCRIPTION OF THE INVENTION

With the term lower pressure zone is meant the zone at which the carbonaceous solid material is present before being fed to step (a) of the process of the present invention. Suitably the pressure of this zone is ambient or about ambient pressure, i.e. 1 bara. With the term higher-pressure zone is meant the zone directly downstream the bulk materials pump. The pressure range of the higher pressure zone is suitably equal to the preferred pressure range as specified for the gasification reactor.

The solid material is preferably a carbonaceous or a particulate solid material and more preferably a particulate solid carbonaceous material. Herein the solid material may sometimes also be referred to as particulate material or carbonaceous material.

The solid material is preferably coal, petroleum coke or a solid biomass. Examples of suitable coal types are anthracite, brown coal, bituminous coal, sub-bituminous coal and lignite.

Solid biomass particulate matter is preferably obtained by torrefaction of a biomass source. Torrefaction is a thermal treatment in the absence of oxygen, preferably at a temperature of between 200 and 300° C. Torrefaction is preferably combined with a compression or pelletisation step in order to make the biomass feed more suited for a gasification process wherein the biomass feed is supplied in a so-called dry form. Torrefaction of a biomass source material is well known and for example described in M. Pach, R. Zanzi and E. Björnbom, Torrefied Biomass a Substitute for Wood and Charcoal. 6th Asia-Pacific International Symposium on Combustion and Energy Utilization. May 2002, Kuala Lumpur and in Bergman, P. C. A., "Torrefaction in combination with pelletisation—the TOP process", ECN Report, ECN-C-05-073, Petten, 2005. Suitable biomass sources are all solid material produced by photosynthesis. Examples of such solid material are wood, straw, grasses, (micro) algae, weeds or residues of the agricultural industry. Examples of suitable residue products are streams generated in the palm oil industry, corn industry, bio-diesel industry, forestry industry, wood processing industry and paper industry.

In case the solid material is coal the particulate solid material preferably has a particle size distribution wherein at least about 90% by weight of the material is less than 90 μm and wherein the moisture content is typically between 2 and 12% by weight, and preferably less than about 5% by weight. In case the solid material is a biomass particulate matter, the particle size distribution may be similar to the one described above for coal or may include larger particle sizes up to 1000 μm.

The bulk materials pump as used in the process according to the present invention comprises a housing having a flow path for the solid material between an inlet and an outlet of said housing. The flow path in said housing is further defined by a space between two rotatable drive disks spaced from each other. Between said drive disks a materials scraper is present to route the cake of solid material, as being transported between said drive disks, to the outlet of the housing of the bulk materials pump and into a transport conduit. The transport conduit fluidly connects the outlet of said housing and the reactor. Publications describing such a pump are U.S. Pat. No. 4,516,674, U.S. Pat. No. 4,988,239, U.S. Pat. No. 5,551,553, U.S. Pat. No. 7,044,288, EP-A-1152963, U.S. Pat. No. 5,381,886 and U.S. Pat. No. 5,051,041.

Preferably a bulk materials pump is used wherein the rotation axes of both disks are tilted with respect to each other. This will result in that the distance between said drive disks at the inlet is greater than the distance between said disks at the outlet. Because the disks rotate along separate and tilted axes a more efficient capturing and compressing of the bulk material is achieved. The higher efficiency results in that less energy input is required. A further advantage is that because of the compacting of the material a better gas seal is achieved between the disks.

The surfaces of the two drive disks facing the flow path of this preferred bulk materials pump are preferably shaped such that at the outlet the two facing surfaces are substantially parallel relative to each other and at the inlet the two surfaces are positioned under an angle relative to each other. Such a surface may be spherical shaped or more preferably conically shaped. With conical shaped is also meant a shape wherein the surface facing the flow path of the bulk materials is made up of a number of pie shaped surfaces which together form a substantially conical shape.

The materials scraper may be a fixed device positioned between the disks and fixed to the housing of the bulk materials pump near the outlet for bulk material. The scraper preferably extends up to and beyond the point where the two rotational axes meet between the two disks. Suitably the materials scraper is a third rotatable disk located partly between said drive disks at the outlet and wherein the direction of rotation of all three disks is the same. By using a rotatable disk as a scraper a more efficient discharge of solids from between the two disks is achieved.

The gaseous stream as injected in step (b) may be of any kind suitable to carry the particulate solid material through the transport conduit. Examples of suitable gasses are nitrogen, carbon dioxide and steam. The amount of gaseous stream added is preferably such that a solid density in the transport conduit is achieved from 50 and 800 kg/m$^3$ and more preferably between 250 and 500 kg/m$^3$. The gaseous stream is suitably injected into the cake at the outlet of the bulk materials pump in a direction parallel to the outlet of said housing, perpendicular to the outlet of said housing or at any intermediate angle.

The mass flow in the transport conduit is preferably chosen to achieve a velocity of the particulate material of between 3 and 30 m/s, more preferably between 5 and 10 m/s. Preferably the reactor is a gasification reactor. The gasification reactor is an entrained flow gasification reactor. Examples of such reactors are described in Gasification, by Christopher Higman and Maarten van der Burgt, 2003, Elsevier Science, Burlington Mass., Pages 109-128. The entrained flow reactor has one or more burners, which are directly connected to the transport conduit. In this manner the particulate material and the gaseous stream are directly fed to the burner. Examples of suitable burners are described in U.S. Pat. No. 4,523,529 and U.S. Pat. No. 4,510,874. In such a burner the stream of particulate material is discharged into the reactor interior via a central channel. A high velocity flow of an oxygen-containing gas is discharged from a co-axial channel of said burner into the particulate material as discharged from the central channel. The burner may be positioned at the top of a reactor and directed downwardly as for example described in US-A-20070079554 or directed horizontally as for example described in EP-A-0400740 or alternatively the reactor may comprise both top fired and horizontally fired burners as for example described in CN-A-1775920. In case of a top fired configuration one or more burners can be used. In case of a horizontal firing typically one or more pairs of diametrically positioned burners are used. For all types of reactor configurations it is preferred that one burner is fed by one, dedicated, bulk materials pump and transport conduit. In this manner a more controlled flow of particulate material can be achieved.

The gasification temperature in the reactor is preferably between 1100 to 1800° C. and at a pressure in the range from 10 to 100 bar, preferably between 30 and 100 bar and more preferably at a pressure of above 35 bar and below 70 bar.

The invention is also directed to a method to start-up a process as described above wherein the stream of pressurised solids as present in the transport conduit is first diverted to a second lower pressure zone and only after the mass flow of solid material in the conduit has reached a stable value a valve as present in the transport conduit is operated to divert the solid material to the reactor. Preferably the second lower pressure zone is the first lower pressure zone.

The invention is also directed to a system to perform the start-up process as described above comprising a low pressure storage vessel fluidly connected to the inlet of a bulk materials pump as described above and in the Figures, a first part of a transport conduit directly connecting the outlet of the bulk materials pump to an inlet of a diverter valve, a second part of the transport conduit connecting an outlet of the diverter valve to a burner as present in a reactor vessel, wherein said diverter valve is provided with a second outlet connecting a recycle conduit with the low pressure storage vessel and which diverter valve can be adjusted to either let particulate material flow from the bulk materials pump to the burner or alternatively let particulate material flow from the bulk materials pump to the low pressure storage vessel.

Figure 1:
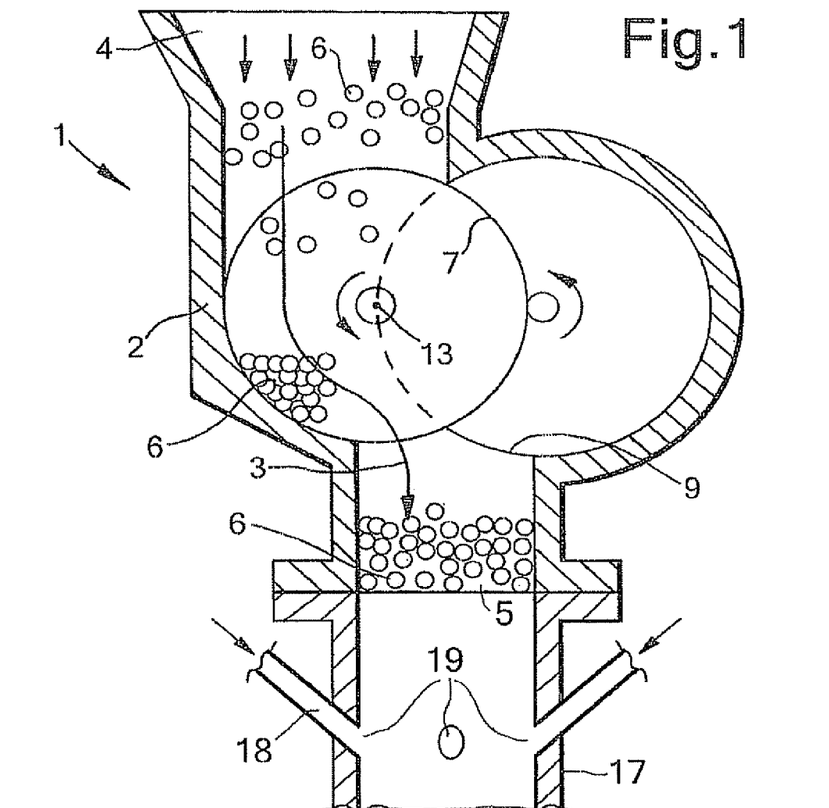
FIG. 1 shows a cross-sectional side view of the bulk materials pump having a rotatable scraper.

FIG. 1 shows a bulk materials pump 1 having a housing 2. A flow path 3 is present for the solid material 6 located between an inlet 4 and an outlet 5 of said housing 2. The orientation of the bulk materials pump is preferably as drawn in FIG. 1 with an inlet at the top end and an outlet at the bottom end. In this manner solid material will enter the inlet and be discharged from the outlet by means of gravity. The flow path 3 in said housing 2 is present between two rotatable drive disks 7 and 8 of which only 7 is shown in FIG. 1. The flow path 3 is further defined by a rotatable materials scraper 9 as positioned between said drive disks 7 and 8. Disks 7, 8 and scraper 9 rotate such that surfaces of said disks 7 and 8 and scraper 9, which surfaces partly define flow path 3, move in the direction of flow path 3 as shown. This will enhance the movement of the solid material 6 and the discharge of the solid material 6 from between the disks 7 and 8 at outlet 5.

Figure 2:
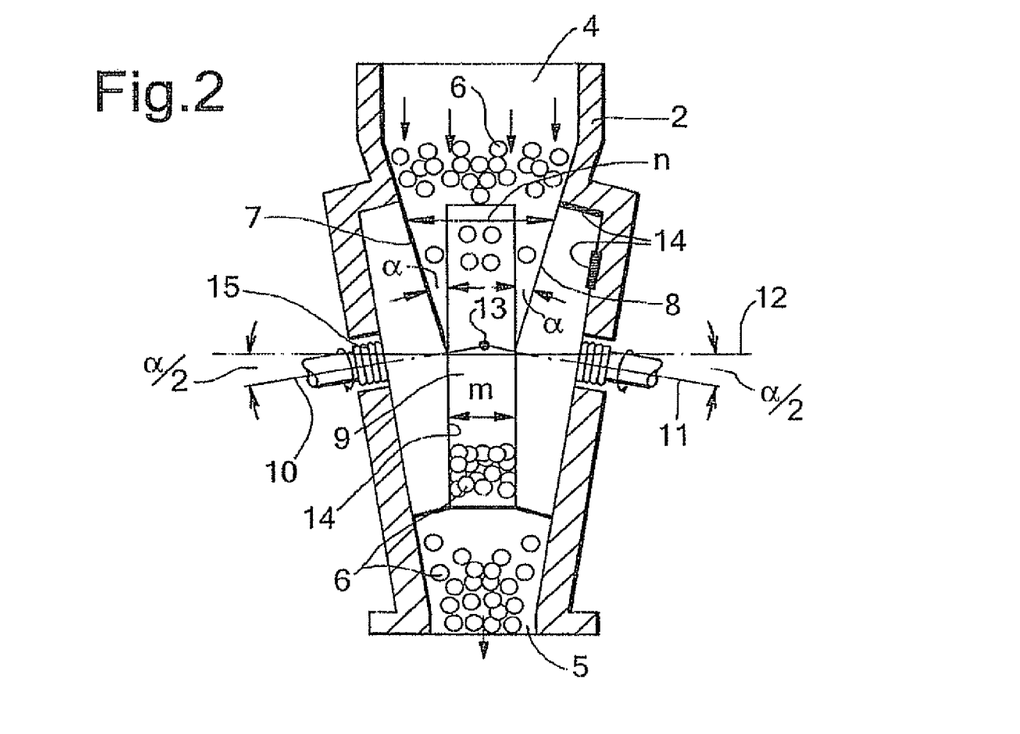
FIG. 2 shows a cross-sectional front view of the bulk materials pump of FIG. 1.

The rotatable materials scraper 9 extends up to point 13 where the two rotational axes 10 and 11 meet between the two disks 7 and 8 as shown in FIG. 2.

FIG. 1 also shows that the outlet 5 of the housing is connected to an upflow end of a transport conduit 17. This end is provided with a supply conduit 18 for the gaseous stream, which exits in the transport conduit 17 via openings 19.

Figure 1A:
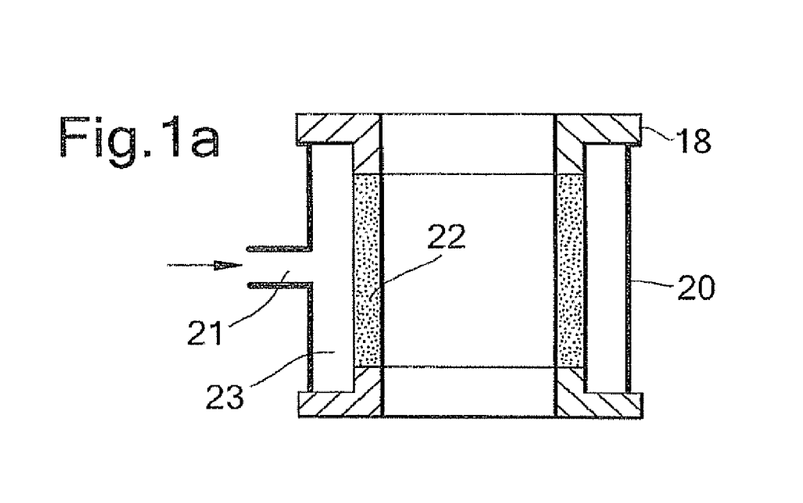
FIG. 1a shows an alternative embodiment for the upper end of transport conduit in FIG. 1.

FIG. 1a shows an alternative embodiment 18a for the upper end of transport conduit 17. In this embodiment the gaseous stream is supplied via inlet 21 to an annular space 23 formed by an interior gas permeable tubular part 22 and an outer gas impermeable part 20. The tubular part 22 forms the interior of the transport conduit. Via the gas permeable part 22 the gaseous stream will be injected into the cake of particulate matter as it is discharged from the bulk materials pump 1.

FIG. 2 illustrates drive disks 7 and 8 having rotation axes 10 and 11 respectively. Disks 7 and 8 have a preferred conical shaped surface facing the flow path 3. As shown disks 7 and 8 are tilted with respect to each other. Preferably the angle α between upright surface of the disk facing the flow path 3 and the vertical as shown in FIG. 2 is between 5 and 45°. The value for the angle α will be dependent on the compactability of the solid material 6. The axes 10 and 11 make an angle of α/2 with the horizontal 12. The axes 10 and 11 are thus not coaxial but are positioned under and angle.

Because of the tilted positioning of the disks 7 and 8 the distance 'n' between said disks at the inlet end of the pump 1 is larger than the distance 'm' between said disks at the outlet 5. In use the solid material entering the pump will be captured between the disks at a location wherein the distance 'n' between said disks is large. When the solid material moves with the direction of the disks the space between said disks will continuously decrease from a distance 'n' to a shorter distance 'm'. The solid material will be compressed while being transported between said disks. This will provide a natural gas lock required to overcome the pressure difference between the lower pressure environment at inlet 4 and the higher pressure environment at outlet 5.

At positions 14 a sealing face may advantageously be present to avoid gas flowing from the high-pressure environment to the low-pressure environment. The sealing face is preferably made of a so-called wear and tear resistant material. Such materials are well known and Teflon is an example of such a material.

A motor (not shown) will drive the axes 10 and 11. A spring loading 15 is present to position the disks 7 and 8 into the vicinity of scraper 9.

Figure 3:
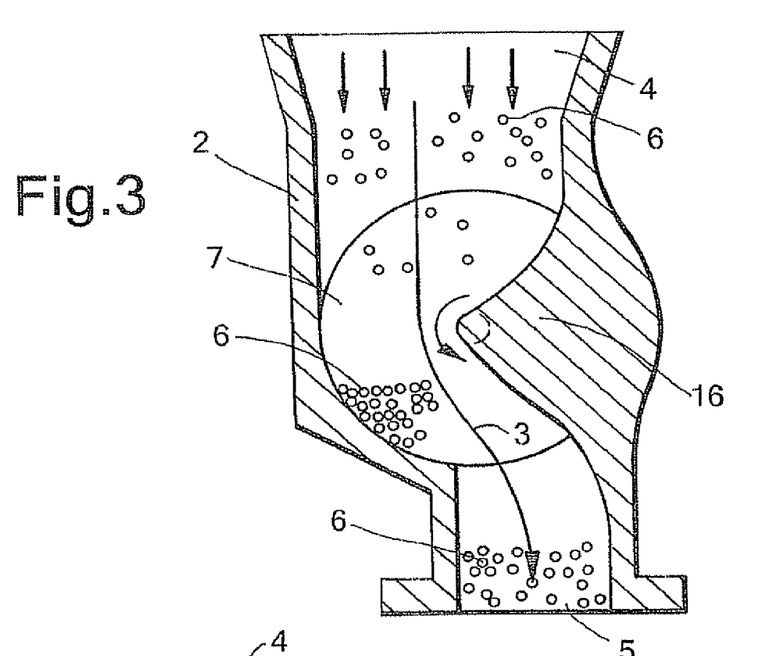
FIG. 3 shows a cross-sectional side view of the bulk materials pump having a fixed scraper.
Figure 4:
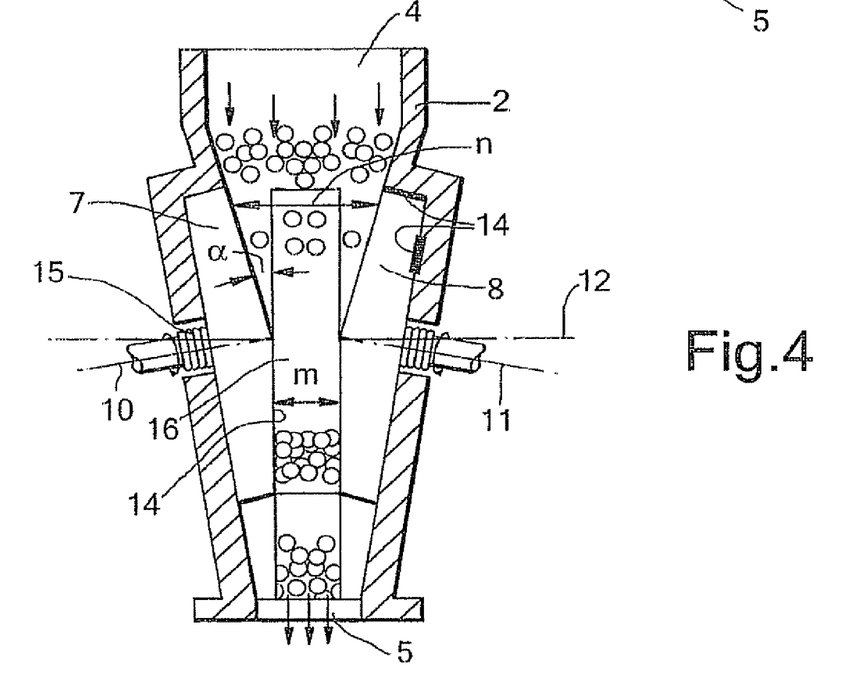
FIG. 4 shows a cross-sectional front view of the bulk materials pump of FIG. 3.

FIGS. 3 and 4 shows a bulk materials pump having a fixed materials scraper 16, which is located partly between said drive disks 7 and 8 and fixed to the housing 2. The other reference numbers have the same meaning as in FIGS. 1 and 2.

Figure 5:
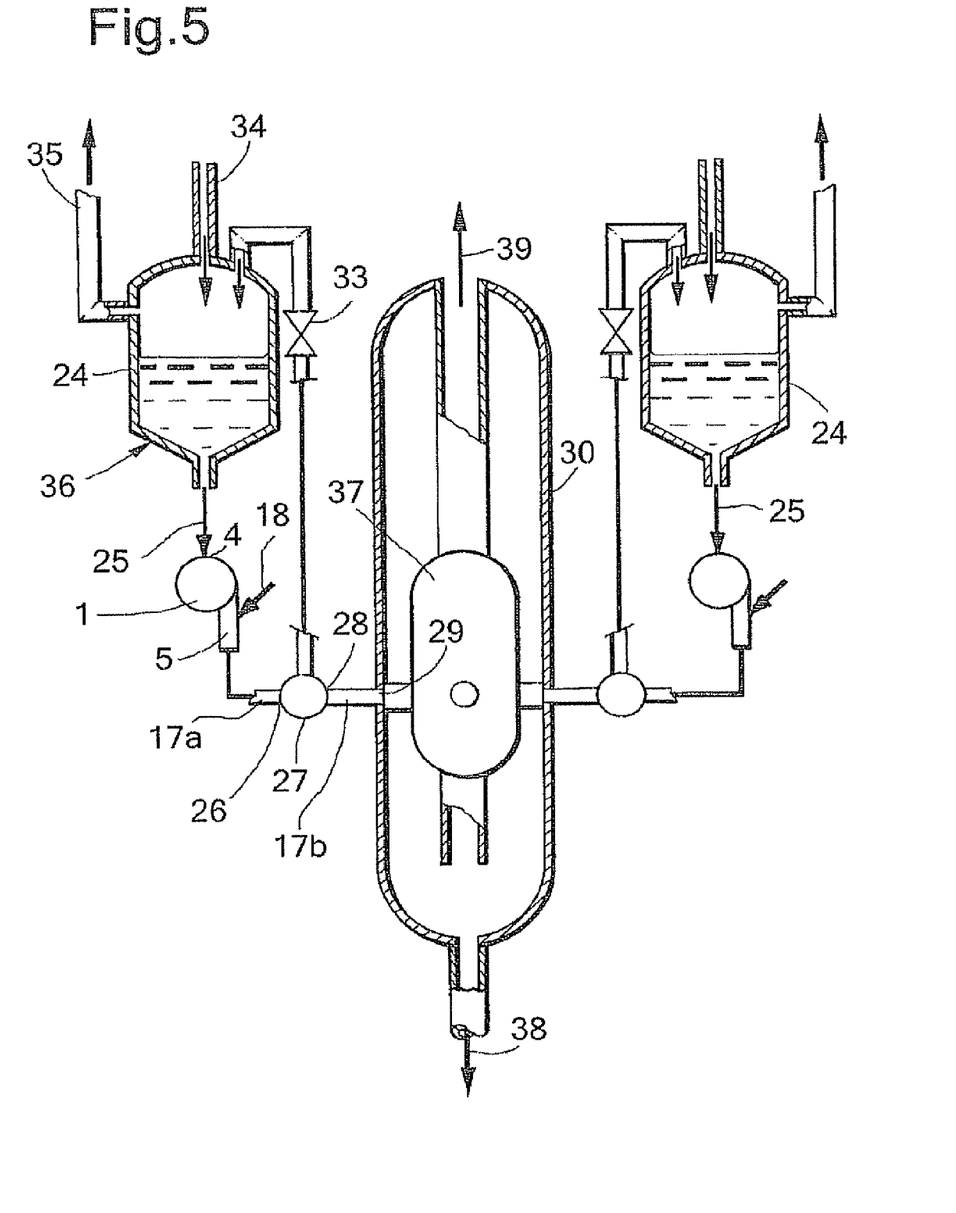
FIG. 5 shows a line-up showing a system for providing particulate matter to a gasification reactor comprising a diverter valve.
Figure 5A:
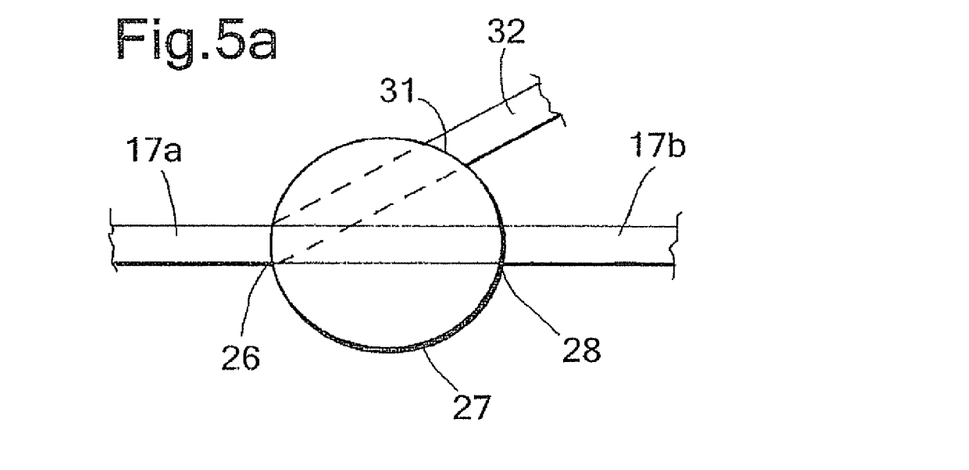
FIG. 5a shows the diverter valve of FIG. 5 in more detail.

FIG. 5 shows a system to perform the start-up process as described above. The system comprises a low pressure storage vessel 24 fluidly connected to the inlet 4 of a bulk materials pump 1 via supply conduit 25. Supply conduit 25 may optionally be provided with de-aerating means as for example described in U.S. Pat. No. 5,657,704. A first part 17a of a transport conduit 17 directly connects the outlet 5 of the bulk materials pump 1 to an inlet 26 of a diverter valve 27. A second part 17b of the transport conduit 17 directly connects an outlet 28 of the diverter valve 27 to a burner 29 as present in a reactor vessel 30. The diverter valve 27, as illustrated in more detail in FIG. 5a, is furthermore provided with a second outlet 31. This outlet 31 connects a recycle conduit 32 with the low pressure storage vessel 24. The recycle conduit is provided with a pressure drop valve 33.

The diverter valve 27 may for example be a valve according to U.S. Pat. No. 4,952,100. Such a valve, as shown in FIG. 5a, can be adjusted to either let a solid material flow from the bulk materials pump 1 to the burner 29 or alternatively let a solid material flow from the bulk materials pump 1 to the low pressure storage vessel 24.

The low pressure storage vessel 24 is provided with a supply conduit 34 for a solid material, a gas vent 35 and a supply for fluidizing gas 36.

The gasification reactor 30 as shown is provided with 2 pairs of diametrically positioned burners 29, a membrane wall 37, a slag discharge 38 and an outlet 39 for the gaseous product of the gasification process, comprising mainly carbon monoxide and hydrogen.

FIG. 5 shows two separate supply systems for two burners 29. For clarity reasons the two remaining systems for the other two burners have been omitted from this FIG. 5.

Figure 6A:
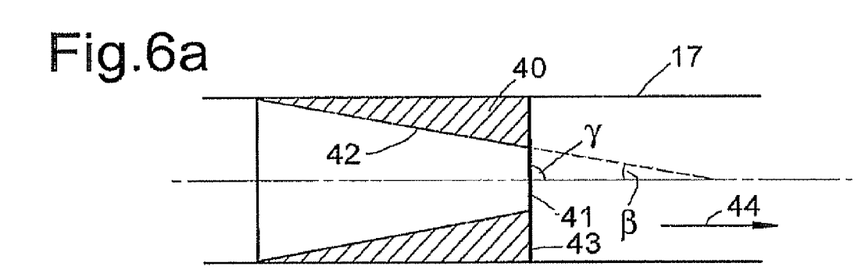
FIGS. 6a, 6b and 6c show a preferred internal in the transport conduit as exemplified in FIG. 5.
Figure 6B:
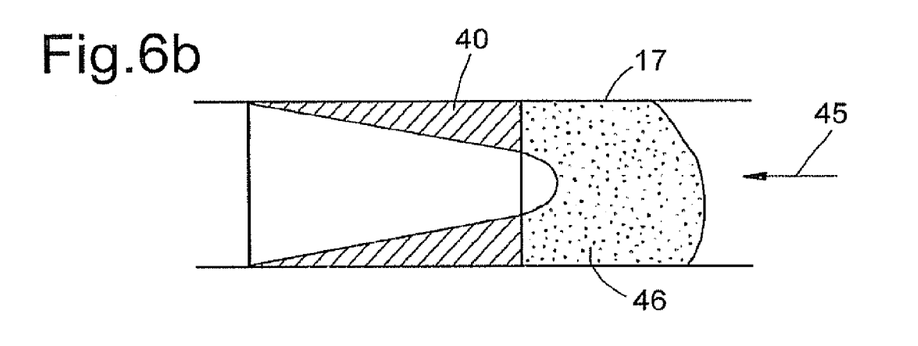
Figure 6C:
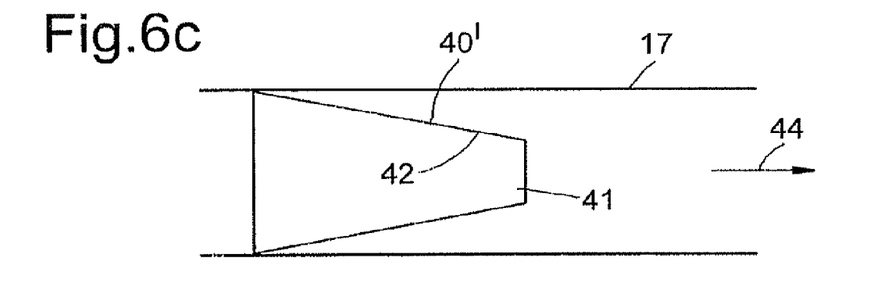

FIGS. 6a, 6b and 6c show part of a preferred transport conduit 17 provided with one or more internals 40 having an opening 41 for solid material and extending from the wall of the transport conduit. The internal 40 suitably extends around the entire circumference of the inner wall of the transport conduit 17. The internal 40 functions as a safety device in case the seal in the bulk materials pump fails and the direction of the flow in transport conduit 17 immediately changes from the normal direction 44 to the reverse direction 45. The design for internal 40 is such solids will pass the internal with little difficulty when flowing in the normal direction 44. The design of internal 40 is in addition such that when the solids flow in the reverse direction 45 solids will immediately accumulate on the internal 40 and form a bridge 46 of solid material. This bridge 46 will prevent the gasses present in the pressurised gasification reactor from entering the low pressure storage vessel 24 of FIG. 5. The formation of such a bridge 46 is found to happen much faster that when a safety valve has to be closed. The internals have a sloped surface at the end facing the bulk materials pump under a slope β with the axis of the transport conduit as shown in FIG. 6a. This slope β is preferably such that no bridging of materials will occur when the gas and solids flow in direction 44. Preferably β is between 1 and 60°, more preferably between 10 and 30°. The opening 41 is preferably chosen such that at least a so-called dense phase conveying flow regime is maintained in said transport conduit 17. The internal 40 may be a frusto conical part 40' as shown in FIG. 6c or be a closed part as shown in FIGS. 6a and 6b wherein the internal also has a surface facing the burner having a slope γ with the axis of the transport conduit as shown in FIG. 6a. Slope γ will be larger than slope β. Slope γ is preferably between 30 and 135°, most preferably 90°.

The internal or internals 40 are preferably located in the upstream part of conduit 17 or in conduit part 17a when a system is used as in FIG. 5. This is to ensure that sufficient solid material is present in the downstream part of conduit 17 to form bridge 46 in case the flow direction reverses. For this reason the length of the conduit 17 should have a sufficient length to ensure that enough solid material is present to form the bridges 46. The required length will depend on the density and speed in the transport conduit and can be derived by simple calculations and/or experimentation by the skilled person.

The supply conduit 18 for a gaseous stream exits in the transport conduit between the bulk materials pump 1 and the internal(s) 40. Transport conduit 17 is preferably externally cooled in order to withstand the high temperature gas from the gasification reactor in case the flow direction reverses to direction 45.

The preferred transport conduit 17 with the internal 40 may also find application in combination with other bulk material pumps. This invention is thus also directed to a system comprising any bulk materials pump, a transport conduit 17 having one or more internals 40, fluidly connecting said pump with a burner as present in a gasification reactor. Apart from the specific pump details all preferred embodiments described above also apply to this further invention.

What is claimed is:

1. A system to provide a particulate solid material comprising a low pressure storage vessel fluidly connected to the inlet of a bulk materials pump, a first part of a transport conduit directly connecting the outlet of the bulk materials pump to an inlet of a diverter valve, a second part of the transport conduit connecting an outlet of the diverter valve to a burner as present in a reactor vessel, wherein said diverter valve is provided with a second outlet connecting a recycle conduit with the low pressure storage vessel and which diverter valve is adjustable to either fluidly connect the bulk materials pump to the burner or alternatively fluidly connect the bulk materials pump to the low pressure storage vessel, the transport conduit being provided with at least one internal having an opening for solid material and extending from the wall of the transport conduit.

2. The system according to claim 1, wherein the solid material is a carbonaceous solid material.

3. The system according to claim 1, wherein a supply conduit for a gaseous stream has an outlet in the first part of the transport conduit.

4. The system according to claim 1, wherein the bulk materials pump comprises a housing having a flow path for the solid material between an inlet and an outlet, wherein said flow path in said housing is further defined by a space between two rotatable drive disks spaced from each other and wherein a materials scraper is present between said drive disks at the outlet, which scraper has the function to route a cake of solid material that is being transported between said drive disks, when the bulk materials pump is used, to the first part of the transport conduit.

5. The system according to claim 1, the at least one internal having a design such that solids will pass the internal with little difficulty when flowing in the direction of the burner and such that when the solids flow in the reverse direction the solids will accumulate on the internal.

6. The system according to claim 1, the at least one internal having a sloped surface at the end facing the bulk materials pump under a slope β with the axis of the transport conduit.

7. The system according to claim 6, the slope β being between 1 and 60°.

8. The system according to claim 7, the slope β being between 10 and 30°.

9. The system according to claim 1, the opening being selected such that at least a dense phase conveying flow regime is maintained in the transport conduit.

\* \* \* \* \*